United States Patent

Schrader et al.

[11] Patent Number: 5,928,074
[45] Date of Patent: Jul. 27, 1999

[54] METHOD FOR REMOVING ORAL CAVITY STAINING, METHOD FOR PROCESSING HOGS, APPARATUS FOR DELIVERING STAIN REMOVING SOLUTION, AND METHOD FOR REDUCING BACTERIA LEVEL IN A HOG CARCASS ORAL CAVITY

[76] Inventors: Melissa A. Schrader, 206 S. Ash, Hillsboro, Kans. 67063; Francois S. Bere, 609 W. Winds Dr., Jacksonville, Ill. 62650; Frederick William Holzhauer, 282 Dahlia Dr., Louisville, Colo. 80027; Scott J. Eilert, 10009 Prairie Woods Ct., Wichita, Kans. 67209; Jerome D. Leising, 19870 Waterford Pl., Shorewood, Minn. 55331

[21] Appl. No.: 08/996,649

[22] Filed: Dec. 23, 1997

[51] Int. Cl.⁶ .............................. A22B 5/08; A22C 17/08
[52] U.S. Cl. .............................. 452/173; 452/77; 452/71
[58] Field of Search .................................. 452/71, 77, 81, 452/198

[56] References Cited

U.S. PATENT DOCUMENTS

| | | |
|---|---|---|
| 3,025,166 | 3/1962 | Smith . |
| 3,475,179 | 10/1969 | Smith . |
| 3,803,669 | 4/1974 | Dillon ...................................... 452/173 |
| 3,958,304 | 5/1976 | Barbee . |
| 4,557,016 | 12/1985 | Markert ................................... 452/173 |
| 4,683,618 | 8/1987 | O'Brien . |
| 4,862,557 | 9/1989 | Clayton et al. .......................... 452/173 |
| 5,041,054 | 8/1991 | Van Den Nieuwelaar et al. ... 452/173 |
| 5,110,583 | 5/1992 | Sampathkumar .......................... 424/48 |
| 5,607,349 | 3/1997 | Karubian et al. ........................ 452/173 |
| 5,632,670 | 5/1997 | Gwyther .................................. 452/173 |
| 5,632,676 | 5/1997 | Kurschner et al. ...................... 452/173 |

OTHER PUBLICATIONS

"Environmental Status and Worker Safety Aspects of Sodium Percarbonate ACTO 140 t 198," Birko Corporation, 9152 Yosemite Street, Henderson, Colorado, (Date unknown).

"Maximize Cleansing Proficiency . . . with FB200 Sodium Percarbonate, the new Interox peroxygen" brochure, Interox America, P.O. Box 27328, Houston, Texas, (Date unknown).

"Peroxygen Compounds for Cleansing and Whitening–Product Data" brochure, Interox America, P. O. Box 27328, Houston, Texas, (Date unknown).

"FB 200 Sodium Percarbonate" brochure, Interox America, P.O. Box 27328, Houston, Texas, (Date unknown).

G.W. Biemuller, J.A. Carpenter, A.E. Reynolds, "Reduction of Bacteria on Pork Carcasses," *Journal of Food Science*, v. 38, (1973) pp. 261–263.

B.M. Gorman, J.N. Sofos, J.B. Morgan, G.R. Schmidt, G.C. Smith, "Evaluation of Hand–Trimming, Various Sanitizing Agents, and Hot Water Spray–Washing as Decontamination Interventions for Beef Brisket Adipose Tissue," *Journal of Food Protection*, v. 58, (Aug. 1995) pp. 899–907.

L. Cabedo, J.N. Sofos, G.C. Smith, "Removal of Bacteria from Beef Tissue by Spray Washing after Different Times of Exposure to Fecal Material," *Journal of Food Protection*, v. 59, No. 12, (1996) pp. 1284–1287.

(List continued on next page.)

*Primary Examiner*—Willis Little
*Attorney, Agent, or Firm*—Merchant, Gould, Smith, Edell, Welter & Schmidt, P.A.

[57] ABSTRACT

A method for removing oral cavity staining in a hog carcass is provided by the invention. The method includes steps of providing a carcass including an oral cavity, applying an aqueous stain removing solution including an oxygen bleaching agent to the oral cavity, and removing the aqueous stain removing solution from the oral cavity. In the preferred embodiments, the aqueous stain removing solution includes an aqueous sodium percarbonate solution containing between about 1% by weight and about 8% by weight sodium percarbonate, and is provided at a pH of between about 9.5 and about 12.0.

21 Claims, 2 Drawing Sheets

OTHER PUBLICATIONS

D.L. Perryman, W.S. Nassif, "The Influence of Processing Techniques on the Final Quality of Tripe," *J. Assoc. Publ.. Analysis,* v. 19, (1981) pp. 95–100.

G.R. Skurray, D.L. Perryman, "The Effects of Alkaline Hydrogen Peroxide Treatment on the Nutritional Value of Tripe," *Meat Science,* v. 4, (1980) pp. 313–318.

A. McNellie, J., Bieser, "Hydrogen Peroxide Uses for the Year 2000," *Food Processing,* (Oct. 1993), pp. 5965.

"Hydrogen Peroxide; Affirmation of GRAS Status with Specific Limitations," Dept. of Health and Human Services, Food and Drug Administration, Federal Register, v. 51, No. 146, (Jul. 30, 1986) pp. 27169–27172.

"Gras Status of Sodium Metasilicate and Sodium Zinc Metasilicate," Department of Health and Human Services, Food and Drug Administration, Federal Register, v. 50, No. 186, (Sep. 25, 1985) pp. 38779–38781.

H.S. Lillard, J.E. Thomson, "Efficacy of Hydrogen Peroxide as a Bactericide in Poultry Chiller Water," *Journal of Food and Science,* v. 48, (1983), pp. 125–126.

"Acto–140 ™" Birko Corporation, P.O. Box 530, Denver, Colorado, (Jan. 7, 1993) pp. 1–3.

D.L. Fletcher, S.M. Russell, J.M. Walker, J.S. Bailey "An Evaluation of a Rinse Procedure Using Sodium Bicarbonate and Hydrogen Peroxide on the Recovery of Bacteria from Broiler Carcasses," *Poultry Science,* v. 72, (1993) pp. 2152–2156.

D.L. Perryman, W.S. Nassif, "The Influence of Processing Techniques on the Final Quality of Trip," *J. Assoc. Publ. Analysts,* v. 19, (1981) pp. 95–100.

Abstract: P. Bianchi et al., "Organoleptic and Nutritional Value of Tripe," *Conservazione degli Alimenti,* Milano. Italia, (Dec. 1984) pp. 32–36 and pp. 38–41.

Abstract: C. Cantoni et al., "Control of Chemical Additives in Tripe (Bovine Stomach)," *Riv. Soc. Ital. Sci. Aliment,* 7(2):177–8 (1978).

Abstract: C. Vidalon M., "Processing of Rumen and Other Meat Products," *An. Cient.,* 8(3–4):217–30 (1970).

Abstract: T. Civera et al., "Bleaching Agents in Bovine Tripe, and Rapid Methods for Their Detection," *Ingegneria Alimentare le Conserve Animali,* 10(5):41, 44–46 (1994).

Abstract: Sh. Ya Babaev, et al., "Preparation of Tripe for Sausage Casings," USSR Patent No. SU 1 688 822 (1991).

Abstract: V. Giaccone et al., "Microbiological and Safety Aspects of Processing and Marketing of Bovine Tripe," *Industrie Alimentari,* 29(286):875–878 (1990).

Abstract: W. Unglaub, "Simple Detection of Bleaching in Tripe," *Fleischwirtschaft* 59(3):347–391 (1979).

Abstract: M. C. Vidalon, "Processing of Viscera and Other Meat Products," *Tecnologia de Alimentos* 10(1):9–19 (1975).

Abstract: J. Koch, "Device for Cleaning Parts of Slaughtered Animals," Swiss Patent No. 479 256 (1969).

Abstract: R. Shipperbottom, "The Decline of Tripe," Disappearing Foods: Studies in Foods and Dishes at Risk. Proceedings of the Oxford Symposium on Food and Cookery, 192–194 (1994).

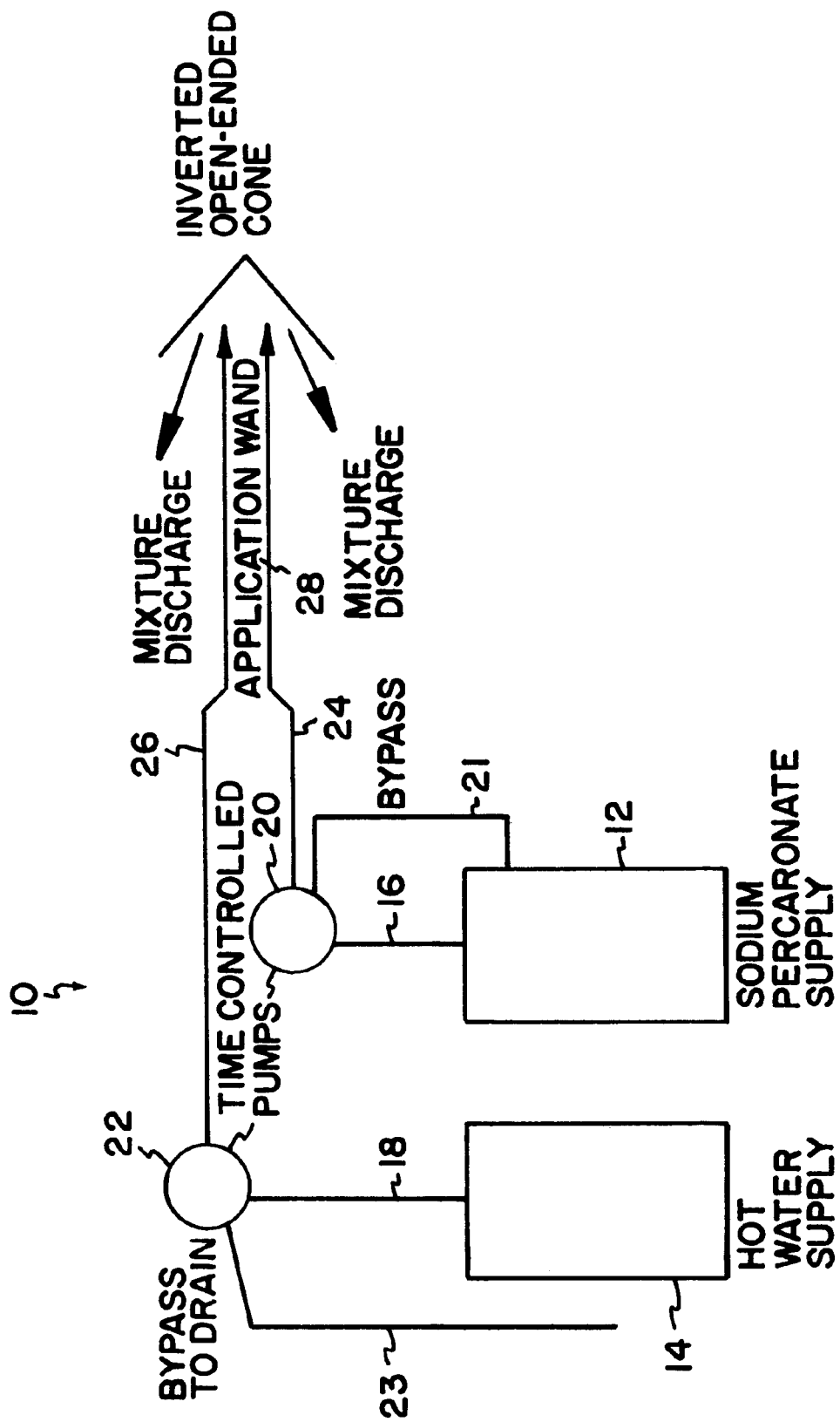

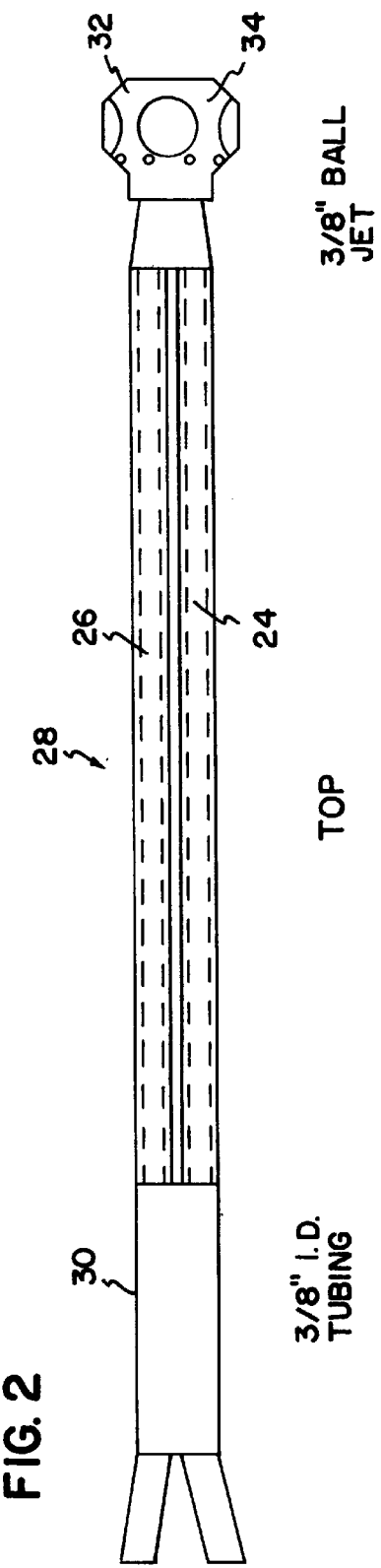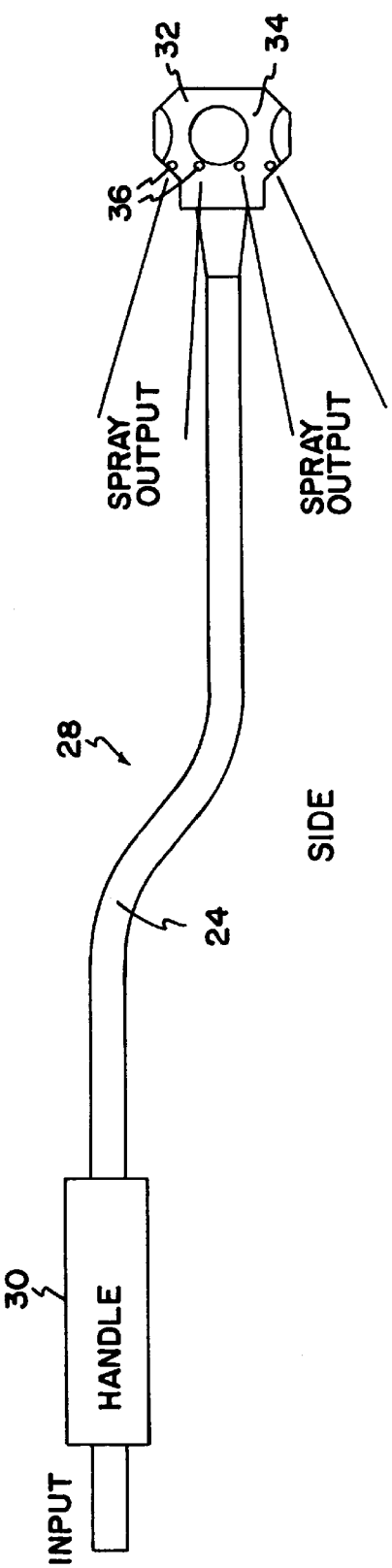

METHOD FOR REMOVING ORAL CAVITY STAINING, METHOD FOR PROCESSING HOGS, APPARATUS FOR DELIVERING STAIN REMOVING SOLUTION, AND METHOD FOR REDUCING BACTERIA LEVEL IN A HOG CARCASS ORAL CAVITY

FIELD OF THE INVENTION

The present invention concerns a method for removing oral cavity staining in hogs; to a method for processing hogs in a slaughter operation; to an apparatus for delivering stain removing solution to a hog oral cavity; and to a method for reducing bacteria level in a hog carcass oral cavity.

BACKGROUND OF THE INVENTION

Sodium percarbonate has been used for many years in commercial slaughter operations as a bleaching agent for cleaning tripe. Techniques for cleaning tripe are described in U.S. Pat. No. 3,958,304 to Barbee; Perryman and Nassif, "Influence of Processing Techniques on the Final Quality of Tripe." J. Assoc. Publ. Analysis, 1981, vol. 19, pages 95–100; and Skurray and Perryman, "The Effects of Alkaline Hydrogen Peroxide Treatment on the Nutritional Value of Tripe," Meat Science, 1980, vol. 4, pages 313–318.

Sodium percarbonate is available from Birko Corporation under the name ACTO-140™ and is approved by the United States Department of Agriculture for use in cleaning tripe, beef feet, beef ears, beef tendons, for bleaching laundry, for use in shroud whitening, and as a bleach for grease and tallow. The ACTO-140™ product is available as a solid, oxygen bleach, including about 99.5% by weight sodium carbonate peroxyhydrate (referred to as sodium percarbonate), and about 0.5% by weight sodium carbonate as an impurity. Sodium percarbonate has the chemical formula $Na_2Co_3 \cdot 1.5H_2O_2$.

Processes for treating animal products using sodium percarbonate are described, for example, in U.S. Pat. Nos. 3,025,166 and 3,475,179 to Smith, and assigned to Birko Chemical Corporation.

Hydrogen peroxide has been classified, at least since 1986, as GRAS (generally recognized as safe) for use as a direct human food ingredient. Hydrogen peroxide, alone or in combination with sodium carbonate, has been researched as an antimicrobial agent. Biemuller et al., *Journal of Food Science*, vol. 38, 1973, pages 261–263, describes the use of a 5% solution of hydrogen peroxide to reduce the bacterial load on inoculated pork carcasses by 2 log. In the study, the bleaching action of hydrogen peroxide caused an unacceptable appearance of the pork skin. A 5% solution of hydrogen peroxide has been proven effective at reducing the bacterial load on beef carcasses. See Gorman et al., *Journal of Food Protection*, vol. 58, August 1995, pages 899–907; and Cabedo et al., *Journal of Food Protection*, vol. 59, no. 12, 1996, pages 1284–1287. The logarithmic reduction effect of hydrogen peroxide is minimized as the water temperature is increased to 74° C. It is believed that the hot water does not reduce the effectiveness of hydrogen peroxide but that the scalding effects of water is additionally responsible for killing bacteria. This effect has been found for other decontamination agents including trisodium phosphate and acetic acid. Lillard and Thomson, *Journal of Food Protection*, vol. 48, 1983, pages 125–126, investigated hydrogen peroxide as a bactericide in poultry chiller water. Total plate count and *E. coli* numbers were reduced by 95–99% when hydrogen peroxide values were equal or greater than 6,600 ppm. As in the aforementioned pork carcasses study, the appearance of the poultry carcasses was unacceptable due to the bleaching action. Fletcher et al., *Poultry Science*, vol. 72, 1993, pages 2152–56, describe the use of a 2% sodium bicarbonate rinse solution followed by a rinse with 3% hydrogen peroxide to remove bacteria from poultry carcasses. See U.S. Pat. No. 4,683,618 to O'Brien. The logarithmic reduction in total plate count was less than one.

SUMMARY OF THE INVENTION

A method for removing oral cavity staining in a hog carcass is provided by the present invention. The method includes a step of providing a hog carcass including a body and attached head, wherein the head includes an oral cavity having oral cavity staining. In most situations, it is expected that the staining will be the result of ingesta staining. Furthermore, it should be understood that the method can be adapted for use in a slaughter operation during on-line processing of a hog carcass. Another step in the method includes applying an aqueous stain removing solution to the oral cavity staining and allowing the stain removing solution to remain in contact with the oral cavity staining for a length of time sufficient to remove at least a portion of the oral cavity staining. In the preferred embodiments, the length of time is between about 1 minute and about 5 minutes. Generally, this length of time corresponds with the amount of time available prior to inspection of the oral cavity by government inspectors. The method additionally includes a step of removing the aqueous stain removing solution from the oral cavity. In most applications, it is expected that the aqueous stain removing solution is removed by rinsing with warm water prior to inspection of the oral cavity by government inspectors.

The aqueous stain removing solution is preferably a solution which includes an agent other than water which assists in the removal of ingesta staining of the oral cavity of a hog carcass. Preferably, the agent is an oxygen bleaching agent. An aqueous sodium percarbonate solution having a weight percent of sodium percarbonate between about 1% by weight and about 8% by weight is preferable because sodium percarbonate has been approved by the U.S.D.A. for use in processing other food products. In order to provide desired alkaline drive for oxygen bleaching, it is preferred that the solution is provided at a pH of between about 9.5 and about 12.0. In addition, the temperature of the solution at the time of application should be greater than 100° F. and preferably between about 110° F. and about 130° F.

A method for processing hogs is additionally provided by the present invention. The method includes a step of providing a hog that has been bled for at least about 6 minutes wherein the hog includes a carcass including a body and attached head. The head includes an oral cavity including oral cavity tissue, such as tongue and mouth lining. The method includes a step of applying an aqueous stain removing solution to at least a portion of the oral cavity tissue and allowing the stain removing solution to remain in contact with the oral cavity tissues for at least 30 seconds. The stain removing solution is then removed from the oral cavity and the head is separated from the body. Both the head and the body are then processed separately for the recovery of edible products.

An apparatus for delivering an aqueous stain removing solution to a hog oral cavity is provided by the present invention. The apparatus includes a first conduit for delivering a concentrated aqueous stain removing solution comprising an oxygen bleaching agent at a temperature below about 50° F., and a second conduit for delivery of elevated temperature water. A mixing chamber is provided for receiving concentrated aqueous stain removing solution and elevated temperature water and mixing to provide an aqueous bleaching agent solution characterized by a pH of between about 9.5 and about 12.0, and a temperature between about 100° F. and about 140° F. The apparatus additionally includes a spray nozzle constructing for delivering a metered amount of the aqueous stain removing solution to a hog oral cavity.

A method for reducing bacterial level in a hog carcass or a cavity is provided by the present invention. The method includes a step of providing a hog including a body and attached head, wherein the head includes an oral cavity and oral cavity tissue. The method includes a step of applying an aqueous solution of sodium percarbonate to at least a portion of the oral cavity tissue and allowing the solution to remain in contact with the oral cavity tissue for at least 30 seconds. The method additionally includes a step of rinsing the solution from the oral cavity with potable water. It is expected that this method will provide a reduction of Coliforms level by at least about 0.25 log.

BRIEF DESCRIPTION OF THE DRAWINGS

FIG. 1 shows a schematic view of on line oral cavity bleaching agent delivery equipment;

FIG. 2 shows a top view of the application wand of FIG. 1; and

FIG. 3 shows a side view of the application wand of FIG. 2.

DETAILED DESCRIPTION OF THE PREFERRED EMBODIMENT

Oral cavity staining is a particular concern in the hog slaughter industry. Hog heads are regularly inspected during the slaughter operation. If inspectors observe ingesta staining in the oral cavity of a hog, the entire head of the hog is condemned. As a result, tissue in the hog head which can normally be recovered and sold is lost in those heads that are condemned. Ingesta staining is a common cause of staining of the oral cavity of hog heads, particularly the tongues. If the ingesta stain cannot be removed or sufficiently reduced, the entire hog head is condemned. It has been found that warm water rinsing alone is not sufficient to remove or sufficiently reduce ingesta staining in the oral cavity of hog heads.

In the context of the present invention, the oral cavity refers to mouth of a hog and includes the tongue and mouth lining. The oral cavity is not meant to encompass the esophagus and later alimentary canal tissue including the stomach or intestines. For purposes of this invention, the terms "pig" and "hog" are used interchangeably and generally refer to any animal classifiable as swine. In this description, reference to hogs is not meant to exclude pigs or any classified species of swine, and is particularly not meant to distinguish between sexually mature or immature animals or animals which have been castrated, unless specifically identified.

The hog slaughter operation involves several steps. Live hogs are brought to a holding station near a slaughter operation. The live hogs are held in holding pens for a length of time which allows further digestion to occur, and which allows the hogs to relax after having been introduced into a new environment. A condition known as pale soft exudive (PSE) is sometimes found in pork and is believed to be caused at least in part when stressed hogs are slaughtered. By allowing the hogs an opportunity to relax in the holding station, it is believed incidence of PSE can be reduced. In addition, farmers often do not withdraw feed from their hogs prior to delivery to a slaughter operation. If the hogs are slaughtered before they have a sufficient amount of time to digest their food, an increased amount of ingesta staining is often observed. Accordingly, it is desirable to keep the hogs in a holding area for sufficient amount of time to advance digestion. It is generally desirable to provide a holding time of at least about two to three hours.

The slaughter operation generally begins with a step of individually stunning each hog. This is generally done by introducing an electrical shock that renders the hog unconscious. It should be understood that reference herein to a "carcass" generally refers to a hog after it has been stunned and rendered unconscious. In addition, the carcass refers to the body and the head when they are attached, and to the body only when the head is removed from the body. Furthermore, it should be understood that the slaughter operation of the present invention is generally an assembly line type operation where each hog is moved and processed along a series of stations. While the following discussion often focuses on the processing of a single hog, it should be understood that the slaughter operation of the present invention includes the processing of numerous hogs. In a preferred embodiment of the invention, the processing of the hogs for removal of ingesta staining can be referred to as "on line" processing because the hog are processed as normal except that the processing additionally includes the removal of ingesta staining.

Once a hog is rendered unconscious, it is bled and elevated by its hind legs. It has been found that gravity can cause certain bodily fluids to move from the digestive track and into the oral cavity. The flow of fluids through the oral cavity is generally slow and continuous until the head is severed. Once the hog has been bled, which usually takes at least about 6 minutes, the carcass is processed to remove hair and debris. This processing involves scalding the carcass in a tank of hot water for about 7 minutes, followed by steps of singeing, polishing, rinsing, and scraping the carcass.

After the carcass has been bled and scalded, the oral cavity is treated with a stain removing solution in order to remove ingesta staining. It is desirable to delay treatment with the stain removing solution until internal fluids have moved from the digestive tract. Generally, this means that the stain removing solution is preferably applied at least about 13 minutes after the hog was stunned. Preferably, the stain removing solution is applied by spray application. The spray is preferably an aqueous liquid which is applied to the oral cavity for a time sufficient to coat the areas of ingesta staining or the tissue stained by ingesta with a layer of solution. It has been found that this spray time is generally between about 0.5 and about 2 seconds per oral cavity. It is expected that this time corresponds to the length of time it takes to apply a metered amount of the stain removing solution. In the case of an aqueous solution containing about 4% by weight sodium percarbonate, it is expected that metered amount will be between about 20 ml and 60 ml per oral cavity, and more preferably between about 30 ml and about 50 ml. It should be understood that the amount of solution applied should be enough to provide the desired degree of stain removal in a given time period. If too little stain removing solution is used, then the stain removal will be insufficient. If too much stain removing solution is used, then much of the solution will be wasted.

The stain removing solution is preferably an aqueous solution including an agent (other than water) which assists in the removal of ingesta staining. Preferably, the agent is an oxygen bleaching agent. In the situation where the stain removing solution includes an aqueous sodium percarbonate solution, it is generally desirable for the solution to be applied at as warm a temperature as possible without damaging or denaturing the oral cavity tissue. In general, this means that the temperature of the solution should be less than about 180° F. It has been found that aqueous sodium percarbonate functions better as a bleaching agent when it is provided at elevated temperatures. Thus, if the solution is too cold, sufficient bleaching and/or removal of ingesta staining may not be observed. In general, it is expected that the solution should be applied at a temperature of at least about 100° F. in order to provide sufficient cleaning action. A consideration when selecting the delivery temperature of the solution in a slaughter operation is the comfort of the operator administering the solution. If the solution is delivered manually, the temperature should not be so great as to cause discomfort to the worker. In this case, the temperature should be between about 110° F. and about 130° F. An optimum temperature for delivering solution manually is about 120° F. By automating the administration of the stain removing solution or otherwise protecting the worker from the temperature of the solution, it is expected that the delivery temperature of the solution can be increased. In such a situation, it is expected that the delivery temperature of the solution can be provided at, for example, between about 130° F. and about 170° F. Even more preferably, the temperature should be between about 140° F. and about 150° F.

The stain removing solution is then allowed to remain in place on the stained oral cavity tissue in order to act on the stain. The length of time the solution is allowed to remain on the oral cavity is referred to as the dwell time. If the dwell time is too short, then the solution may not provide sufficient stain removal. It is believed that longer dwell times reflect a greater degree of stain removal and a greater extent of solution breakdown. In the case of an aqueous solution containing 4% by weight sodium percarbonate, it has been observed that the sodium percarbonate loses its stain removing ability over time as it breaks down into water, oxygen, carbonate, and sodium. It has been found that for light staining, a dwell time of at least one minute, and more preferably two minutes, is desirable when using an aqueous solution containing 4% by weight sodium percarbonate. For heavy staining, a dwell time of at least three minutes is preferable for an aqueous solution containing 4% by weight sodium percarbonate. For certain applications, it is expected that the dwell time can be as low as 30 seconds and as long as 10 minutes.

It should be appreciated that the upper limit on the dwell time is generally controlled by other steps in the slaughter operation. An advantage of the present invention is that it can be adapted to existing slaughter operations without substantial modifications to the operation. The steps of applying the stain removing solution and rinsing the stain removing solution can be inserted between other steps in the slaughter operation. In particular, the steps of applying the stain removing solution and rinsing the stain removing solution are preferably introduced after the carcass has been bled and scalded, but before inspection of the oral cavity by the government inspectors. It is important to remove the stain removing solution from the oral cavity before the government inspectors evaluate the oral cavity. Thus, although the solution may lose its effectiveness if left on longer than necessary to obtain stain removal, it is expected that the length of time it remains on the oral cavity depends on the other steps occurring in the slaughter operation. For example, in a typical slaughter operation, the earliest the stain-removing solution can generally be applied is after the carcass has been scalded, and it should generally be removed or rinsed away prior to inspection of the oral cavity. It is an advantage of the present invention that the method for removing stains can be adapted to industry accepted slaughter techniques without disruption of the floor operations or significantly delaying the slaughter operation.

In a preferred embodiment of the invention, the stain removing solution is applied after the carcass has been bled, scalded in a hot tank of water, singed to remove hair, and polished twice. Once the stain removing solution has been applied, the carcass is further processed during the dwell time. Specifically, the carcass exterior is again singed and thoroughly rinsed and scraped to remove hair, the hooves are trimmed, and the rectum is loosened and tied off. Although the carcass exterior is rinsed, it is not expected that the rinse water from this step will be directed inside the oral cavity, or that it will wash away significant amounts of the stain removing solution from the oral cavity.

Once the dwell time is complete, the oral cavity is rinsed with warm water. This warm water rinse removes residual stain removing solution and other matter in the oral cavity including ingesta, hair, and other foreign matter. The water is preferably provided at a temperature of between about 90° F. and 120° F. and each oral cavity is rinsed for between about 1 and about 3 seconds. A particular oral cavity is rinsed for a sufficient time to remove foreign matter. Prior to the present invention, the oral cavity was rinsed with cold water. It is expected that the rinse time with warm water to remove stain removing solution will not be significantly longer than prior rinse times with cold water.

Once the oral cavity has been rinsed with warm water, the head is severed so that no further contamination flows from the ingestive tract through the oral cavity. The head remains attached via skin at the front of the neck. Government inspectors then review each head looking for signs of disease and infection. As part of the inspection, the inspectors observe the glands for inflammation and the oral cavity for ingesta, ingesta staining, and hair. If the inspectors observe the presence of ingesta, ingesta staining, or hair in the oral cavity, the head is condemned. Condemned heads are severed from the carcass and sent to rendering operations where they are further processed into inedible products. Heads that pass the inspection are forwarded on for further processing. It is believed that the USDA standard for condemning heads for ingesta staining is that the existence of any staining is grounds for condemning a head.

Subsequent to the inspection, the head is later removed from the carcass and is processed by removing the edible portions, i.e., tongue, cheek meat, and ears. In addition to the aforementioned rinsing, certain edible portions may be further processed in batch washing operations. The edible meat can then be further processed and sent on to consumers.

Stain Removing Solution

The stain removing solution is applied to the oral cavity during the hog slaughter operation in order to remove ingesta staining found within the oral cavity. By removing the ingesta staining from the tissue in the oral cavity, less heads are condemned and the meat found in the heads can be recovered. By application of the present invention, it is expected that for a healthy population of hogs processed through a slaughter operation, the percentage of heads condemned for ingesta staining will decrease by at least about 15%, and more preferably by at least about 25%, compared with oral cavities being rinsed with warm water only.

In a preferred embodiment of the invention, the stain removing solution includes an oxygen bleaching agent. A preferred oxygen bleaching agent can be provided by an aqueous solution of sodium percarbonate. It is understood that in an aqueous solution of sodium percarbonate, it is the perhydroxy radical which is the active agent mostly responsible for providing the bleaching action in the oral cavity. Sodium percarbonate which can be used in the stain removing solution according to the present invention is available under the tradename ACTO-140™ from Birko Chemical Corporation.

While the present description focuses on the use of an aqueous sodium percarbonate solution as the aqueous stain removing solution, it should be appreciated that the invention is not limited to the use of sodium percarbonate. As an alternative stain removing solution, it is expected that sodium perborate would function favorably for removing ingesta staining. It is expected, however, that sodium perborate may not receive government approval for use with animal tissue because a potential residue is boric acid which is toxic and which may remain on tissue if not sufficiently rinsed therefrom. In addition, chlorine bleaching agents may provide sufficient stain removal activity, but it is expected that certain types will cause off flavor to the tissue and may result in the presence of toxic chlorides if not sufficiently washed away. Sodium percarbonate is particularly advantageous because it has received government approval for several applications in the slaughter industry. As an alternative to using sodium percarbonate, it should be understood that one could provide a stain removing solution by mixing hydrogen peroxide with sodium carbonate or other suitable alkaline builder. While it is expected that such a system can be used to provide a desired degree of stain removal, it is believed that a system which involves combining hydrogen peroxide with sodium carbonate may be more difficult to control and potentially dangerous to the operators.

A sodium percarbonate solution provides desired stain reducing activity when it is provided in the oral cavity at a temperature of between about 100° F. and 180° F. and at a concentration of between about 1% by weight and 8% by weight. Preferably, the sodium percarbonate solution is provided at a temperature of between about 110° F. and 150° F. in order to provide desired stain reducing activity. Furthermore, it is preferred that the concentration of sodium percarbonate in water is between about 2% by weight and about 6% by weight in order to obtain a desired level of activity.

In the case where the stain removing solution is an aqueous sodium percarbonate solution, it has been found that the ingesta stain removing capabilities are enhanced at pH levels of between about 9.5 and about 12. In general, if the pH is lower than about 9.5, the solution lacks sufficient bleaching capabilities. That is, the solution tends to lose its alkaline drive. If the pH is above about 12, the solution tends to "burn" or hydrolyze the tissue it contacts. A more preferable pH range is between about 10.3 and about 10.6

In situations where sodium percarbonate is used as the hydrogen peroxide bleaching agent in the stain removing solution, it is generally desirable for the solution to be prepared at a high concentration of sodium percarbonate and at a low temperature. It has been found that the low temperature helps provide increased shelf life, and allows a solution to be stored for at least an eight hour period without unacceptable loss of activity. When it is desired to use the aqueous sodium percarbonate solution, the low temperature/high concentration solution is combined with hot water to provide a solution at the desired application concentration and temperature. In general, the storage temperature of the solution should be below about 50° F. If the temperature is too low, the sodium percarbonate may precipitate out and/or the solution may become too viscous to handle properly. While it may be desirable to provide as much sodium percarbonate in solution as possible, it is generally expected that the maximum concentration of sodium percarbonate in solution at about 50° F. will be about 25% by weight. At about 50° F., it is expected that a 19% by weight sodium percarbonate solution will maintain at least about 90% of its available oxygen in the first 8 hours. Accordingly, 8 hours at this temperature and concentration is found to be an acceptable shelf life. An 8 hour shelf life is desired because it means that only one batch of solution needs to be prepared for an 8 hour shift.

In order to maintain the stability of the cold, high concentration solution of sodium percarbonate, it is desirable to use water which has a low mineral content. In fact, the water can be referred to as demineralized water, and is generally not considered "hard water". It has been found that the presence of large amounts of calcium and magnesium tends to have an adverse effect on the stability of the aqueous sodium percarbonate solution. Thus, while hard water can be used in the present invention, it is usually less advantageous for use in preparing the cold, high concentration solution of sodium percarbonate because of the instability problems. The water which is preferably used as the hot water stream or the rinse stream is preferably "potable water", which means that it is acceptable for use in food systems. It has been found that the water which can be used as the hot water stream or as the rinse stream can be hard water because when using the hot water stream or rinse water, one is not concerned with maintaining shelf life or stability.

Because the aqueous sodium percarbonate solution is very active in warm temperatures, it is desirable to apply it to oral cavity tissue while it is at a high temperature and before its activity has been lost. Accordingly, the above-described high concentration of cold, aqueous sodium percarbonate is preferably blended with a hot water stream in order to immediately elevate the temperature of the solution and reduce the concentration to the desired delivery temperature, concentration, and pH. One should readily appreciate how the amount and temperature of the hot water stream should be controlled in order to adjust the high concentration of cold, aqueous sodium percarbonate to provide the desired delivery temperature, concentration, and pH. By way of illustration, for a target aqueous solution of sodium percarbonate at 120° F. and 4% by weight sodium percarbonate, and a cold stream at a temperature of 50° F. and a concentration of 19% sodium percarbonate, a hot water stream provided at a temperature of 140° F. should be combined with the low temperature stream at a volume ratio of about 3:1 (hot water to cold water). It is expected that the resulting solution would have the desired temperature, concentration, and pH values. In general, it is expected that the hot water stream will be provided at a temperature greater than at least about 130° F., and preferably within a range of about 130° F. to about 210° F. and more preferably between about 140° F. to about 180° F. Preferably, the volume ratio of hot water to cold water is provided between about 5:1 to about 1:5, and more preferably between about 4:1 and about 1:1.

An advantage to using an aqueous sodium percarbonate solution is that the solution rinses well. With sufficient rinsing, the sodium percarbonate ionizes and rinses away. Residual sodium percarbonate can be measured by surface pH, EM Quant Method Test Strip, and residual surface sodium measurements. The pH measurements can be taken with a portable pH meter such an Accumet 1001 meter available from Fisher Scientific of Pittsburgh, Pa. The EM Quant Method Strip is a hydrogen peroxide indicator which provides color measurement upon contact with the tissue surface. In general, it is expected that no hydrogen peroxide should be detected after sufficient rinsing.

Delivery Apparatus

In order to provide for a continuous application of sodium percarbonate solution under the application conditions described above, Applicants have found that an applicator which is depicted in FIG. 1 at reference numeral 10 is preferably utilized. The applicator 10 includes a concentrated bleach reservoir 12 and a hot water reservoir 14. The concentrated bleach reservoir 12 includes a concentrated sodium percarbonate solution in water at a temperature which is sufficiently low to minimize the activity of the solution. In general, sodium percarbonate has a longer shelf life when kept at a cooler temperature. In order to provide the bleaching properties, it must be brought to a higher temperature. The hot water reservoir 14 includes hotter water which when combined with the concentrated sodium percarbonate in reservoir 12 provides a solution of sodium percarbonate at the desired concentration and temperature for bleaching the oral cavity of hogs. The concentrated sodium percarbonate flows through line 16 and the hot water through line 18. Timer control pumps 20 and 22 are provided for metering the flow of concentrated sodiuim percarbonate and hot water through lines 16 and 18, respectively. Once the applicator 10 is activated by a trigger, which can be a foot, knee, or hand-actuated pedal, the timer control pumps 20 and 22 meter a predetermined quantity of fluid therethrough. The fluid then flows via lines 24 and 26 through the application wand 28.

The timer control pump 20 includes a bypass line 21 which allows concentrated sodium percarbonate to flow back into the reservoir 12. The timer control pump 22 includes a bypass drain 23 which allows hot water to flow to a drain. The purpose for bypass lines 21 and 23 is to relieve backpressure, and to provide for control of temperature.

Now referring to FIGS. 2 and 3, a more detailed description of the application wand 28 of the present invention is depicted. As shown, the application want 28 includes a handle 30 for the individual utilizing the application wand 28 to hold it. The concentrated sodium percarbonate flows through line 24 and the hot water flows through line 26 in the application wand 28, and are mixed at the nozzle 32. The nozzle includes a mixing chamber 34 therein which causes the concentrated sodium percarbonate and hot water to mix. The pressure causes the mixture to spray outward of the nozzle 32 through openings 36. It is preferable that the spray is directed backward in the direction of the handle 30. Thus, when the nozzle 32 is inserted within the hog oral cavity, the spray will not be directed down the throat, but rather spray the inside of the oral cavity. In addition, the individual utilizing the application wand 28 may pull the wand outward from the oral cavity as the fluid is discharging from the nozzle 32. It is expected that this movement will assist in dislodging matter found in the oral cavity.

In a preferred application of the invention, the concentrated sodium percarbonate solution includes a 19% by weight water solution of sodium percarbonate at 50° F. The water is preferably provided at 140° F. The water is then mixed with the concentrated sodium percarbonate in the mixing chamber 20 at a volume ratio of about 3 to 1, respectively. The resulting mixture can then be characterized as a 4% by weight solution of sodium percarbonate at 120° F. At this concentration of temperature, the solution is very active for removing ingesta staining.

This invention is directed to the use of a sodium percarbonate rinse coupled with a warm water rinse to effectively remove severe tongue stains that were not removed by warm water rinsing alone. The focus of the following description provides the optimal conditions for removal of ingesta stains from pork tongues with a sodium percarbonate rinse and confirms that the treatment and rinsing protocol established was sufficient to remove any residual sodium percarbonate from the tongue.

Sodium percarbonate is used extensively as a bleaching agent for removing ingesta stains from tripe. Sodium percarbonate is an addition compound of hydrogen peroxide and sodium carbonate. The bleaching action of the perhydroxyl radical (product of the loss of the loss of a hydrogen ion from hydrogen peroxide) is optimal at higher pH values. A particularly optimal pH value is 10.5. The addition of sodium carbonate to hydrogen peroxide adds stability and safety to hydrogen peroxide.

The breakdown products of sodium percarbonate include carbonate, oxygen, water and sodium. An effective method for monitoring residual sodium percarbonate is by sodium and pH analysis of rinsed tissues. In general, it is desirable to provide the rinsed tissue with a sodium level of 110 mg per 100 g of sample, and a pH level of 5.5 to 7.5 to ensure that the sodium percarbonate has been sufficiently rinsed away. See U.S.D.A. Handbook 8 for the sodium levels. It is expected that either test can be used to monitor the step of rinsing to provide the desired degree of rinsing.

While the above method is described with respect to present hog processing techniques in the United States, it should be appreciated that the principles of the invention can be applied to slaughter operations in other countries or to operations as they may be conducted in the United States upon subsequent revision of the applicable regulation. The techniques described above are a preferred way for removing or reducing ingesta staining in hogs. The following examples are provided for further identifying various features of the invention, and are not meant to limit the scope of protection which is limited only by the claims attached hereto.

EXAMPLE 1

Optimal Ingesta Stain Removal

Government inspection personnel, or line inspectors condemn pork heads for oral cavity staining based upon ingesta staining found. Excel Corporation devised a 6-point scale to subjectively evaluate each tongue before and after treatment. The scale is as follows:

(1) None: No visible stain present
(2) Slight: Very low amounts of yellow/orange stain
(3) Small: Low amount of yellow/orange stain
(4) Modest: Medium amount of yellow/orange stain
(5) Moderate: Highly intense yellow/orange stain
(6) Extreme: Extremely intense yellow/orange stain It is believed that tongues classified as "none" or "slight" staining are not likely to be condemned by government inspection personnel; that tongues classified in the "small"

category would have approximately a 50% chance of being condemned for staining; and that tongues classified as "modest," "moderate," or "extreme" staining would be condemned.

Sodium percarbonate is available under the name ACTO-140™ from Birko Corporation in Henderson, Colo. Solutions having sodium percarbonate concentrations of 4% and 6% were formulated with 120° F. potable water. These concentrations were tested and compared for providing acceptable bleaching for an average dwell time of approximately 3 minutes and 50 seconds. It was determined that both solutions, delivered into the oral cavity at 120° F., provide the cleaning action necessary to remove ingesta stains. In order to remove any added sodium and stop the hydrogen peroxide reaction with surface tissue, a 120° F. potable water wash was implemented following treatment.

Pork oral cavities were treated with approximately 40 ml of 4% sodium percarbonate solution at 120° F. potable water. The dwell time of the solution was predetermined by locating the optimal placement of solution delivery and rinse on the slaughter floor layout. The level of staining was again evaluated according to the 6-point scale. Shorter dwell times (time between solution application and rinsing) were investigated in trial studies and were not found to be as effective as this length of time. To determine level of stain removal, sixteen carcasses were selected with varying degrees of staining. Oral cavities were scored on the 6-point scale, treated with the aforementioned procedure and scored again to determine degree of stain removal.

Before treatment, 5 of the 16 heads that were selected would have a high probability of passing USDA inspection for staining. After treatment with sodium percarbonate, all the heads would have a high probability of passing USDA inspection for staining. As our trial studies indicated, a treatment with a 4% solution of sodium percarbonate followed by a warm water rinse dramatically reduced the rate of head condemnation due to tongue staining.

EXAMPLE 2

Residual Determination

A 4% solution of sodium percarbonate was utilized in this study and compared to a control where no sodium percarbonate solution was utilized. A delivery system was developed to optimize the activity of the sodium percarbonate solution. The delivery system used is diagrammed in FIG. 1. A 19% (w/w) sodium percarbonate solution was prepared with 50° F. water and blended with 140° F. potable water to achieve, upon delivery into the oral cavity, a 4% (w/w) solution of sodium percarbonate at 120° F. (pH=10.4). The solution was applied at a pressure of 50 psi, delivering approximately 40 ml of solution per oral cavity. This resulted in approximately a two second spray time. After a 3 minute and 50 second dwell period, the oral cavities were rinsed with 120° F. potable water. This rinsing station was placed prior to the area of government head inspection. Treatment application and initial rinsing took place prior to removal of the tongues from the oral cavity.

For this study, carcasses were randomly selected, regardless of degree of staining. This treatment was administered to 120 consecutive pork carcasses, followed by the potable water rinse. After the potable water rinse, the heads were collected in containers identified as "condemned material" and transferred to an off line area for removal of the tongues. The tongues were transported back to the slaughter floor and rinsed. At the end of the shift (not more than 1.0 hr. after treatment) treated tongues were rinsed in a rinsing vat using 50° F. water, at an approximate 2:1 water to tongue ratio, for three minutes. At that time, a sample of tongues was removed and the rinsing was continued for an additional two minutes (constituting the 5 minute rinsing treatment). Another sample was pulled after 5 minutes.

Control pork tongues were taken from 120 consecutive pork carcasses. The oral cavities were rinsed with 120° F. potable water while the head was still attached to the carcass. The tongues were removed and rinsed in a rinsing vat for 3 minutes (representative of the current process).

For each treatment replicate, five tongues were selected at random from the rinsing vat after three and five minutes of rinsing, from the same vat. Tongues were similarly selected from a washing vat containing untreated tongues for the control. The top 1 cm surface of the tongue was removed by a scalpel, placed into a whirlpack, and labeled respectively by replicate and sample number. This sample was frozen not more than 12 hours after collection and shipped frozen to an outside laboratory (Silkiker Laboratories, Cedar Rapids, Iowa) for analysis of residual sodium levels using Atomic Emission Spectroscopy (USDA, 1993).

Three surface pH measurements per tongue were taken on each of fifteen tongues for each treatment (control, treatment with 3 minute rinse, treatment with 5 minute rinse). The pH measurements were taken on the back, center, and front portions of the top surface of the tongue with a portable pH meter (Accumet 1001, Fisher Scientific, Pittsburgh, Pa.). The three measurements were averaged to form the mean pH measurement for each tongue.

Experiment one was conducted as a completely randomized design (Steel and Torrie, 1980), with each of the 16 carcasses representing a replicate. Data was analyzed by comparing degree of tongue stain removal. Experiment two was also conducted in a completely randomized fashion. Tongues from each replicate of sodium percarbonate treatment were allocated to either the three or five minute wash treatment. Therefore, the data was analyzed by applying two different one-way analysis of variance (ANOVA). One analysis compared the control treatment (no sodium percarbonate application) to the sodium percarbonate treated tongues with three minutes of rinsing. The other ANOVA compared the five minute rinse treatment to the control. Each treatment was replicated three times, with rinse vat (N=120 tongues) as the experimental unit.

The treatment of the oral cavity with sodium percarbonate, followed by potable water rinse and a three or five minute potable water wash did not alter the amount of sodium remaining on the surface of the tongue (P>0.05; FIG. 3). It appears that the combination of a warm water rinse of the oral cavity, followed by a cold water batch washing of the tongues will be sufficient to remove any residual sodium due to sodium percarbonate treatment. Most all slaughter operations employ these types of rinsing procedures to maintain the quality and wholesomeness of the tongues, and to chill the tongues prior to packaging. Thus, the sodium percarbonate application could be added to existing systems with sufficient control of the process.

It is important to note that this sodium data was collected in a "worst case" scenario fashion. Only the top layer of the tongue was analyzed, as opposed to analyzing the entire tongue. Our process is more than sufficient to control residual sodium even in this scenario.

Tongues from sodium percarbonate treated heads that were batch washed for 3 minutes did have a significantly higher (P>0.05; FIG. 4) pH than control tongues. However, the actual difference was very minimal. (6.75 vs. 6.82).

There was no difference between the control and the 5 minute batch rinsing treatment. Pork tissue inherently has a fairly high pH variance pre-rigor. It is our hypothesis that the small differences in pH noted in this study would be overshadowed by the natural variance in pre-rigor pH. This data was collected strictly at the surface of the tongue with a surface pH probe ("worst case" scenario). If we had excised the top layer of the tongue and homogenized this tissue, we likely would not have found any significant pH differences.

Treatment of pre-rigor pork tongues with a 4% solution of sodium percarbonate followed by rinsing of the oral cavity and batch washing of the removed tongues, is a very effective way to remove ingesta stains from tongues. The rinsing involved in this process is very adequate to remove any residual sodium with virtually no pH effect. Residual sodium and surface pH were tested under "worst case" conditions. The process involved is very simple to control and easily added to the current pork slaughter process. We feel that the process can be effectively monitored with a HACCP based system. The chemicals involved are currently used in the industry for a similar purpose and are GRAS listed. The use of sodium percarbonate to remove ingesta stains from pork tissue is a safe and effective way to reduce condemnation of pork heads. Sodium percarbonate should be GRAS listed to treat pork oral cavities just as it is listed to treat beef trip and feet.

EXAMPLE 3

Twenty pork heads, condemned for staining, were collected and transferred to a off-line area in appropriately marked containers. The tongues were removed from these heads. The tongues were sampled initially using aseptic techniques. The tongue was divided into four equal quadrants as shown in FIG. 3. Quadrants 1 and 2 were swabbed with a sterile swab. The tongues were treated by spraying for two seconds with a 4% solution of sodium percarbonate at 120° F. and the solution was left to dwell for 3 minutes and 50 seconds. The solution was then rinsed from the tongue with 120° F. potable water. Tongue quadrants 3 and 4 were sampled after treatment and rinsing using aseptic techniques.

Each tongue quadrant included a surface area of about 25 $cm^2$.

Testing shows less than one log reduction in aerobic Coliforms, and generic *E. Coli* counts. The results are provided in the table below:

TABLE 1

| | Microbial Data Results | |
|---|---|---|
| | Mean Values (log) | |
| Microbe | Before | After |
| Aerobic | 3.4 | 3.03 |
| Coliforms | 1.95 | 1.29 |
| E. Coli | 1.72 | 1.16 |

The tongue was the experimental unit and the sample taken on the tongue was the sample unit. One way ANOVA was applied to all variables where more than one treatment has been applied. No statistically significant differences were found. In a line operation, one would expect at least about 0.25 log reduction and more preferably a 0.5 log reduction in aerobic, Coliforms, and *E-Coli* values.

We claim:

1. A method for removing oral cavity staining in a hog carcass, the method comprising steps of:

(a) providing a hog carcass including body and attached head, wherein the head include an oral cavity having oral cavity staining comprising ingesta staining;

(b) applying an aqueous stain removing solution comprising an oxygen bleaching agent to the oral cavity staining and allowing the stain removing solution to remain in contact with the oral cavity staining for a length of time sufficient to remove at least a portion of the oral cavity staining; and (c) removing the aqueous stain removing solution from the oral cavity.

2. A method for removing oral cavity staining according to claim 1, wherein the aqueous stain removing solution is provided at a pH of between about 9.5 and about 12.

3. A method for removing oral cavity staining according to claim 1, wherein the aqueous stain removing solution comprises an aqueous sodium percarbonate solution.

4. A method for removing oral cavity staining according to claim 1, wherein the aqueous stain removing solution comprises between about 1% by weight and about 8% by weight sodium percarbonate.

5. A method for removing oral cavity staining according to claim 1, wherein the length of time is between about 1 minutes and about 5 minutes.

6. A method for removing oral cavity staining according to claim 1, wherein the aqueous stain removing solution is applied to the oral cavity at a temperature of between about 110° F. and about 130° F.

7. A method for removing oral cavity staining according to claim 1, wherein the step of removing the aqueous stain removing solution comprises rinsing the oral cavity with rinsing water.

8. A method for removing oral cavity staining according to claim 7, wherein the rinsing water is provided at a temperature of between about 90° F. and about 120° F.

9. A method for removing oral cavity staining according to claim 1, wherein, after the steps of removing the aqueous stain-removing solution from the oral cavity, the oral cavity has a pH of between about 5.5 and about 7.5.

10. A method for processing hogs, the method comprising steps of:

(a) providing a hog that has been bled for at least about 6 minutes, wherein the hog includes a carcass including a body and an attached head, the head includes an oral cavity and oral cavity tissue;

(b) applying an aqueous stain removing solution to at least a portion of the oral cavity tissue and allowing the stain removing solution to remain in contact with the oral cavity tissue for at least 30 seconds;

(c) removing the stain removing solution from the oral cavity; and (d) separating the head from the body.

11. A method for processing hogs according to claim 10, wherein the aqueous stain removing solution remains in contact with the oral cavity tissue for between about 1 minute and about 10 minutes.

12. A method for processing hogs according to claim 10, wherein the aqueous stain removing solution remains in contact with the oral cavity tissue for between about 2 minutes and about 5 minutes.

13. A method for processing hogs according to claim 10, further comprising a step of:

(a) removing hair from the carcass prior to the step of applying the aqueous stain removing solution.

14. A method for processing hogs according to claim 10, further comprising a step of:

(a) rinsing the carcass with water during the time in which the aqueous solution remains in contact with the oral cavity tissue.

15. An apparatus for delivering an aqueous stain removing solution to a hog oral cavity for removal of ingesta staining comprising:

first conduit for delivery of concentrated aqueous stain removing solution comprising oxygen bleaching agent at a temperature below about 50° F.;

second conduit for delivery of elevated temperature water;

mixing chamber for receiving concentrated aqueous stain removing solution and elevated temperature water and mixing the concentrated aqueous stain removing solution and the elevated temperature water to provide an aqueous stain removing solution characterized by a pH of between about 9.5 and about 12, and a temperature of between about 100° F. and about 140° F.; and spray nozzle constructed for delivering a metered amount of the aqueous stain removing solution to a hog oral cavity.

16. An apparatus for delivering an aqueous stain removing solution to a hog oral cavity for removal of ingesta staining according to claim 15, wherein the concentrated bleaching agent solution comprises an aqueous solution comprising between about 1% by weight and about 8% by weight sodium percarbonate.

17. An apparatus for delivering an aqueous stain removing solution to a hog oral cavity for removal of ingesta staining according to claim 15, wherein the elevated temperature water is provided at a temperature of between about 140° F. and about 180° F.

18. An apparatus for delivering an aqueous stain removing solution to a hog oral cavity for removal of ingesta staining according to claim 15, wherein the elevated temperature water and the concentrated solution are mixed at a volume ratio between about 5:1 and 1:5.

19. An apparatus for delivering an aqueous stain removing solution to a hog oral cavity for removal of ingesta staining according to claim 15, wherein the metered amount is between about 20 ml and 60 ml aqueous stain removing solution.

20. A method for reducing bacteria level in a hog carcass oral cavity, the method comprising steps of:

(a) providing a hog including a body and an attached head, the head includes an oral cavity and oral cavity tissue;

(b) applying an aqueous solution of sodium percarbonate to at least a portion of the oral cavity tissue and allowing the solution to remain in contact with the oral cavity tissue for at least 30 seconds; and (c) rinsing the solution from the oral cavity with potable water.

21. A method for reducing bacteria level in a hog carcass oral cavity according to claim 20, further comprising a step of:

(a) reducing Coliforms level by at least about 0.25 log.

* * * * *

UNITED STATES PATENT AND TRADEMARK OFFICE
CERTIFICATE OF CORRECTION

PATENT NO. : 5,928,074

DATED : JULY 27, 1999

INVENTOR(S) : SCHRADER ET AL.

It is certified that error appears in the above-identified patent and that said Letters Patent is hereby corrected as shown below:

Col. 7, line 49: "bum" should read --"burn"--

Signed and Sealed this

Tenth Day of April, 2001

Attest:

NICHOLAS P. GODICI

Attesting Officer     Acting Director of the United States Patent and Trademark Office